US007113219B2

(12) United States Patent
Adams et al.

(10) Patent No.: US 7,113,219 B2
(45) Date of Patent: Sep. 26, 2006

(54) CONTROLS FOR DIGITAL CAMERAS FOR CAPTURING IMAGES AND SOUND

(75) Inventors: Guy de Warrenne Bruce Adams, Stroud (GB); Amy E. Battles, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 804 days.

(21) Appl. No.: 10/242,583

(22) Filed: Sep. 12, 2002

(65) Prior Publication Data

US 2004/0051809 A1     Mar. 18, 2004

(51) Int. Cl.
*H04N 5/225* (2006.01)
(52) U.S. Cl. ...................................... 348/374
(58) Field of Classification Search .................. None
See application file for complete search history.

(56) References Cited

U.S. PATENT DOCUMENTS 5,754,894 A * 5/1998 Kirigaya et al. .............. 396/77
2001/0026263 A1* 10/2001 Kanamori et al. ........... 345/156
2001/0048473 A1* 12/2001 Gotanda ....................... 348/207
2001/0051509 A1* 12/2001 Mukai et al. ................. 455/90
2003/0142227 A1* 7/2003 van Zee ................... 348/333.1
2003/0174218 A1* 9/2003 Battles et al. ............. 348/231.4
2004/0096114 A1* 5/2004 Tomita et al. ............... 382/239

FOREIGN PATENT DOCUMENTS

GB      2386493 A       9/2003
JP      11-018041       1/1999

OTHER PUBLICATIONS

U.S. Appl. No. 10/098,135, Battles et al.

* cited by examiner

*Primary Examiner*—Ngoc-Yen Vu
*Assistant Examiner*—Dillon Durnford-Geszvain
(74) *Attorney, Agent, or Firm*—Thomas, Kayden, Horstemeyer, & Risley, llp

(57) ABSTRACT

A digital camera has both image capture and audio capture modes. The digital camera has: a control member moveable from an initial position to a first position for effecting audio capture and to a second position for effecting image capture. A releasable latch means latches the camera in the audio capture mode upon entry of the control member into the first position.

24 Claims, 6 Drawing Sheets

CONTROLS FOR DIGITAL CAMERAS FOR CAPTURING IMAGES AND SOUND

BACKGROUND OF THE INVENTION

1. Field of the Invention

This invention relates to capture controls in digital cameras which have audio as well as image capture capabilities.

2. Description of Related Art

The term "image capture button" may sometimes be referred to as the "shutter button" or "shutter release button", even though it will be appreciated that digital cameras generally do not have a shutter mechanism.

Many cameras, both digital and conventional film-based, have a shutter button which has an intermediate 'focus lock' position. The position of the shutter button when fully released is often referred to as the S0 position, whilst the focus lock position is known as the S1 position. The position at which the button effects the capture of an image (i.e. when fully depressed) is referred to as the S2 position.

If audio is also to be captured, an appropriate mechanism is needed.

BRIEF SUMMARY OF THE INVENTION

According to a first aspect of the invention there is provided a digital camera having both image capture and audio capture modes, the digital camera comprising: a control member moveable from an initial position to a first position for effecting audio capture and to a second position for effecting image capture; and releasable latch means to latch the camera in the audio capture mode upon entry of the control member into the first position.

According to a second aspect of the invention there is provided control means for a digital camera, the digital camera having both image capture and audio capture modes, the control means comprising: a user-operable member moveable from an initial position to a first position for effecting audio capture and to a second position for effecting image capture; sensing means for detecting when the said member is in the first position or the second position; and processing means electrically coupled to the sensing means, the processing means being responsive to input from the sensing means and configured to effect audio capture and/or image capture in the camera in accordance with the input from the sensing means; wherein the user-operable member and/or the processing means are operable to retain the camera in the audio capture mode when the user-operable member is moved in use into the first position, such that the user need not manually hold the user-operable member in the first position.

This advantageously enables the camera's audio capture state to be maintained without the user needing to hold the user-operable member in the first position, thereby alleviating fatigue to the finger, hand or arm, and reducing the likelihood of hand shake. With the camera having been locked in the audio capture mode, the user is free to participate fully in whatever event is taking place, and can take photographs whenever desired. Using the one user-operable moveable member to control both audio capture and image capture provides a simple user interface, and does not lead to a confusing multiplicity of controls on the camera.

It is important to emphasise that the audio capture mode and the image capture mode are by no means mutually exclusive. Indeed, one of the main advantages of the present invention is that it provides a means for capturing one or more images whilst simultaneously capturing sound.

Preferably the control means further comprise retaining means adapted to retain the user-operable member in the first position. The provision of such retaining means provides an simple, intuitive, effective and reliable mechanism by which the camera may be retained in the audio capture mode. By retaining the user-operable member in the first position the user is given a physical indication and assurance that the audio capture mode is being maintained.

In accordance with a first embodiment of the invention, preferably the user-operable member comprises a button located within a frame, the button being moveable in a first direction into the first and second positions; the button and the frame are adapted to allow lateral displacement of the button when in the first position, said lateral displacement being in a direction substantially orthogonal to the said first direction; and the button and the frame comprise regions adapted to engage and thereby retain the button when the button is laterally displaced in the first position. The use of a button to effect image capture is well established, and hence it will be intuitive to the user to operate a button which is adapted to be laterally displaceable in the first position. It is also advantageous that both image and audio capture are controlled by the same button, as this means that no additional control buttons need be provided, thereby enabling the user interface to be uncluttered in appearance. The frame may be a region of the casing of the camera itself, through which the button passes.

Preferably the regions adapted to engage comprise a lip portion extending from the button and adapted to catch around the frame. This provides a simple and inexpensive button retention mechanism.

Particularly preferably the regions adapted to engage comprise a detent. This advantageously assists in holding the button once displaced laterally in the first position.

Preferably the sensing means comprise first switching means operable in use to effect audio capture and second switching means operable in use to effect image capture, the first switching means being arranged such that movement of the button into the first position actuates the first switching means, and the second switching means being arranged such that movement of the button into the second position actuates the second switching means, the second switching means being actuatable by depression of the button regardless of whether or not the button is retained in the laterally-displaced first position. This advantageously enables the user to take photographs when audio capture is taking place, or when the button is in its initial released position, simply by pressing the button.

Particularly preferably the first and second switching means are such that the force required to actuate the first switching means is less than the force required to actuate the second switching means.

Preferably the first and second switching means are arranged in series.

Preferably the first and second switching means are mounted such that their lateral position with respect to the frame remains constant, even when the button is laterally displaced.

Preferably the control means further comprise biasing means arranged to urge the button into the initial position when it is not being retained in the first position. The biasing means may comprise a spring acting on the button in the direction of the initial position, or may be integral with the switching means.

Preferably the control means further comprise third switching means operable in use to effect focus lock in the camera. This advantageously provides even greater functionality to the user via the one button, which is operable to effect audio capture, image capture and focus lock. Preferably the third switching means are such that they are actuated on application of a force between that required to actuate the first switching means and that required to actuate the second switching means.

If the button is held in the second position, preferably the processing means are configured to cause the camera to capture a video sequence or a plurality of still images in quick succession. This is analogous to the "motor wind" mode in some traditional (non-digital) cameras, and provides yet further functionality to the user via the one button.

In accordance with a second embodiment of the invention, preferably the user-operable member comprises a rotary member rotatable from the initial position to the first position and then, in the same rotational sense, further rotatable to the second position. A rotary dial-type member has the advantage of providing a greater number of positions than a button-based mechanism. Preferably the control means further comprise a detent at the first position for retaining the rotary member at the first position.

The control means may further comprise a detent at the initial position.

Preferably the control means further comprise a spring return acting on the rotary member and arranged to return the rotary member from the second position to the first position. This advantageously provides an intuitive and simple-to-use action for the user, whereby the user moves the rotary member from the initial position to the first position to begin audio capture, then from the first position to the second position to take a photograph, and then simply releases the rotary member for it to spring back to the first position. Further photographs may be taken in the same manner, and then the rotary member may be rotated back to the initial position to end audio capture.

Alternatively, preferably the rotary member is further rotatable, in the same rotational sense, from the second position to the initial position. Moving the rotary member directly from the second position to the initial position enables audio capture to be ended immediately after the photograph has been taken, without having to return via the first position. The control means may further comprise a detent at the second position.

Preferably the control means further comprise a third position between the first and second positions, whereby rotation of the rotary member into the third position in use effects focus lock. The third position may be provided with sensing means electrically coupled to the processing means, and may also be provided with a detent. Alternatively, the third position may be a virtual position defined by the rotary member having been rotated past the first position and towards the second position but without having reached the second position. In the latter alternative, the processing means are employed to determine when the rotary member has been moved into the third position.

If the rotary member is held in the second position, the control means may be configured to cause the camera to capture a video sequence or a plurality of still images in quick succession.

In accordance with a third embodiment of the invention, the processing means may be configured such that, on moving the user-operable member from the initial position into the first position, the processing means effect audio capture and retain the camera in the audio capture mode until the user-operable member is moved to another predefined position or through a predefined sequence of positions. The said predefined position may be the initial position. Alternatively the said predefined sequence of positions may comprise moving from the initial position to the first position and then back to the initial position. Accordingly, this provides the advantage that the user-operable member need not be physically retained in the first position in order to maintain the audio capture mode, since the processing means are configured to maintain audio capture until the user provides input to the contrary, by moving the user-operable member to the said predefined audio stop position, or through the said predefined sequence of positions.

According to a third aspect of the invention there is provided a digital camera having any of the control means summarised above.

BRIEF DESCRIPTION OF THE DRAWINGS

Embodiments of the invention will now be described, by way of example, and with reference to the drawings in which.

DETAILED DESCRIPTION OF THE INVENTION

The embodiments of the invention described herein are for implementation in a digital camera having both audio capture and image capture capabilities, such as the Hewlett- Packard Photosmart 812xi camera. Such cameras typically have an integral microphone for recording ambient sounds (although an external microphone could in principle be connected to the camera), and a charge coupled device (CCD) or equivalent image sensing means. The means by which audio sequences and images may be captured, processed and stored by such cameras are known to those skilled in the art, and need not be described herein.

Figure 1:
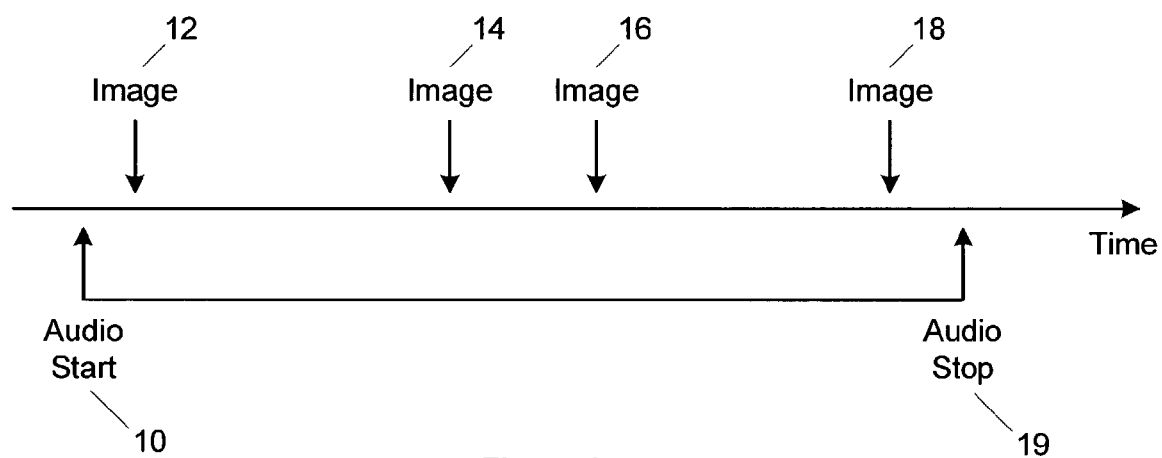
FIG. 1 illustrates a typical sequence of audio capture and image capture events achievable with the present invention.

FIG. 1 illustrates a sequence of audio capture and image capture events that may be achieved using embodiments of the present invention in such a digital camera. Audio capture may be started 10 as and when desired. Whilst audio capture continues, one or more images 12, 14, 16, 18 may be taken. Finally, when the event to be recorded has finished, audio capture is stopped 19.

FIG. 1 depicts a series of images being taken whilst audio capture is maintained. These images may be still images or moving video sequences. In general, the embodiments of the invention will be described in the context of capturing still images during simultaneous audio capture, although it should be appreciated that video capture is also possible in the same manner.

Image Capture Button Terminology

Figure 2:
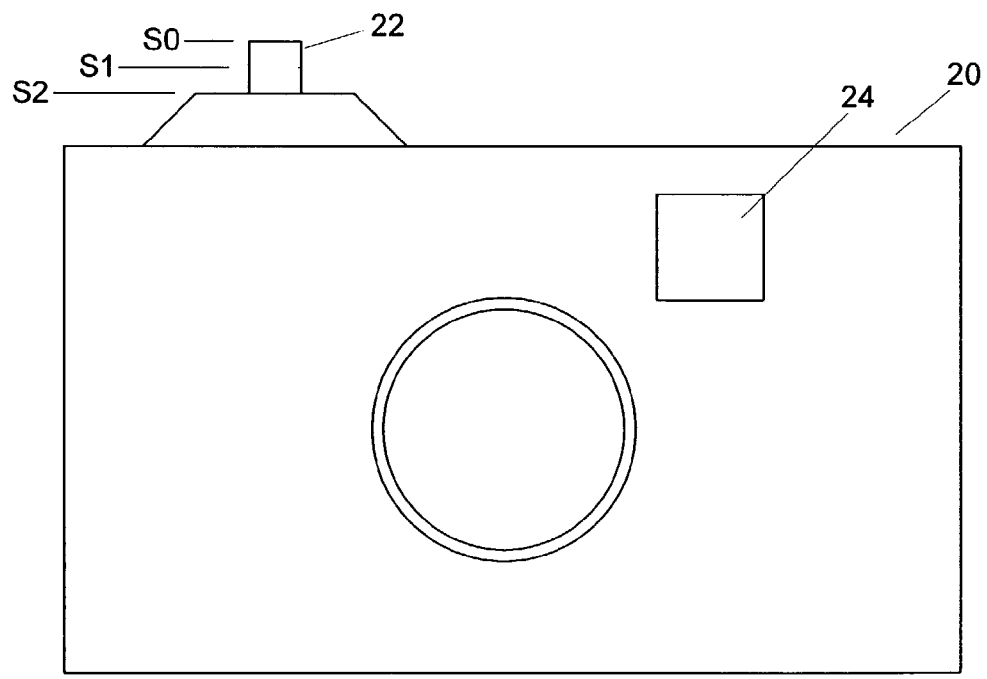
FIG. 2 illustrates a conventional camera having a shutter release (image capture) button depressible from an initial position (S0) to a first position (S1) to achieve focus lock, and to a second position (S2) for shutter release.

FIG. 2 illustrates a conventional camera 20 (which may be non-digital or digital) having an image capture (or "shutter release") button 22. When the button 22 is fully released, as shown in FIG. 2, it is said to be in the S0 position. This position is also referred to herein as the "initial" position.

The image capture button 22 also has a focus lock position (S1) and a subsequent shutter release position (S2). When pressed, the button 22 moves from the initial (S0) position to the intermediate (S1) position, and then, when fully depressed, to the S2 position. Typically the button is engineered such that the user feels some resistance when the button reaches the S1 position. In traditional cameras the focus lock (S1) position locks the focus of the camera on an object as viewed in the viewfinder 24, and this focus is then maintained when the button is fully depressed to the S2 position to take the photograph.

EMBODIMENT 1

Enhanced Image Capture Button

Figure 3:
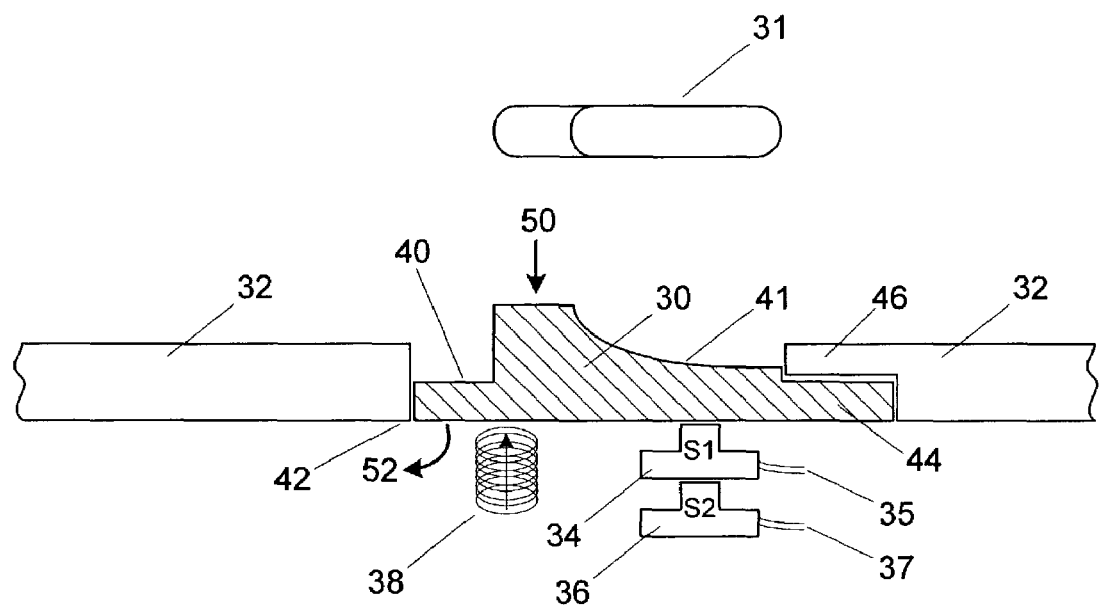
FIG. 3 illustrates a cross-sectional view of an image capture button in accordance with a first embodiment of the invention, the button being in its initial (released) state, and a plan view of part of the button from above.

FIG. 3 shows a cross-sectional view of an image capture button 30 in a digital camera. A plan view 31 of the top surface of the button, which is designed to be contacted by the users finger, is also shown. The button 30 is mounted within an aperture in the frame 32, which may be part of the casing of the camera itself. In this figure the button 30 is shown in its initial (S0) position, that is to say, released and causing neither image capture nor audio capture in the camera.

The button 30 is arranged to be depressible by the user to a first position (the S1 "focus lock" position) and further to a second fully depressed position (the S2 image capture position).

Switches or actuators 34, 36 are mounted beneath the button 30, and are arranged such that they are actuated by movement of the button 30 into the S1 and S2 positions respectively. Connecting wires 35, 37 (shown in FIG. 3 but omitted from subsequent figures for clarity) electrically connect the switches 34, 36 to the camera's processor. In FIG. 3, neither switch is actuated, and hence (as shown in the box alongside the Figure) the logic state of each switch is 0.

A spring 38 is mounted beneath the button 30 and is arranged so as to bias the button towards its initial (S0) position. That is to say, the spring 38 is compressed as the button 30 is depressed, and accordingly the spring 38 acts so as to urge the button upwards.

Whilst biasing of the button 30 towards its initial position is highly desirable, it need not be provided by a spring such as shown in the Figure. By way of an alternative, the switches themselves may have integral springs having the requisite properties, and so these may be employed to provide the desired biasing effect on the button 30.

When the button 30 is pushed into the S1 position the first (S1) switch 34 is actuated and a signal is sent to the processor to effect audio capture. This corresponds to the "audio start" event 10 as shown in FIG. 1.

Likewise, when the button 30 is subsequently pushed into the S2 position the second (S2) switch 36 is actuated and a signal is sent to the processor to effect image capture. This corresponds to any of the "image capture" events 12, 14, 16, 18 of FIG. 1.

The first and second switches are arranged such that the second switch 36 is mounted in a fixed position, and the first switch 34 is attached to the second switch, essentially in a series configuration. The force required to actuate the first switch 34 is less than that required to actuate the second switch 36, and this may be achieved by the first switch 34 having a lower spring constant than the second switch 36. This means that depression of the button 30 onto the first switch 34 (i.e. into the S1 position) causes the first switch 34 to be actuated first. The actuation of this switch provides tactile feedback to the user, making him aware that the button has entered the S1 position. On pressing the button 30 further (i.e. by the user applying a greater force) the first switch 34 is pressed onto the second switch 36. Accordingly, the button enters the S2 position and the second switch 36 is actuated.

The button 30 may be held in the S1 position to maintain audio capture. Whilst the user may manually hold the button in the S1 position if he wishes, doing so has disadvantages as discussed earlier. Thus, an important feature in accordance with the invention is the provision of means by which the button 30 may be retained (or "locked") in the S1 position such that the user may remove his finger without the button coming out of the S1 position and the camera leaving the audio capture mode.

Figure 4:
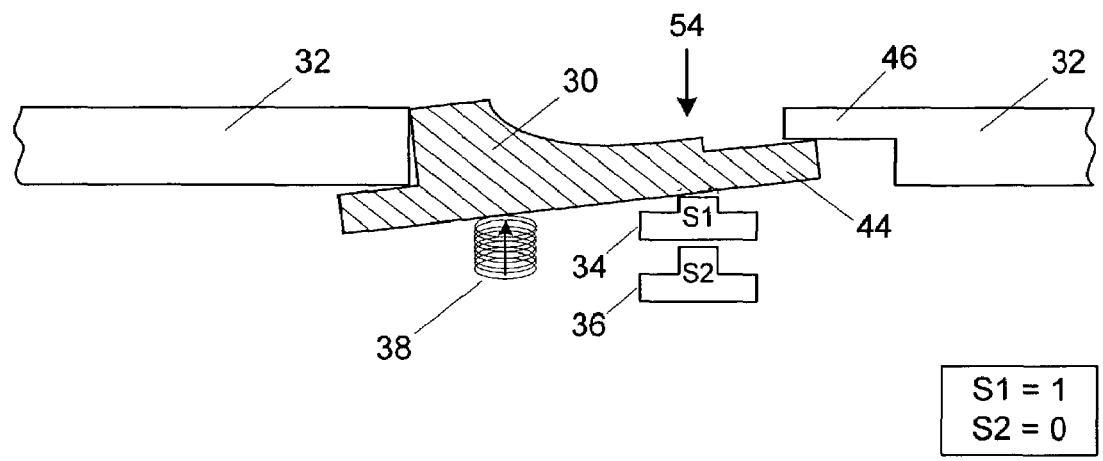
FIG. 4 illustrates the button of FIG. 3 having been depressed to the first (S1) position to actuate the corresponding first switch to effect audio capture, the button also having been displaced laterally (to the left in the figure) to retain the button in the S1 position and thereby maintain audio capture.
Figure 5:
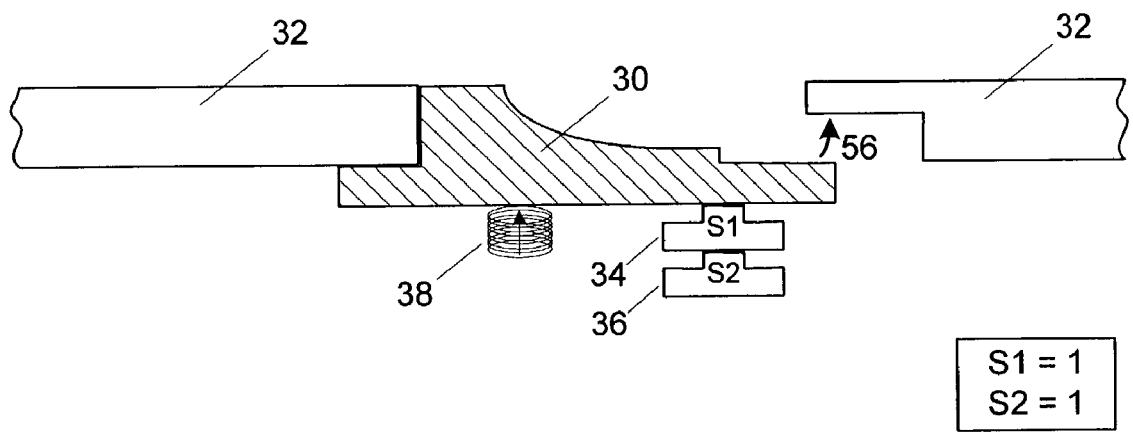
FIG. 5 illustrates the button of FIG. 4 having been further depressed into the second (S2) position to actuate the corresponding second switch to effect image capture whilst maintaining audio capture.

A mechanism by which the button 30 may be retained in the S1 position is illustrated in FIG. 3 and its operation is shown further in FIGS. 4 and 5. The button 30 comprises a lip portion 40 extending laterally from the bottom of the button. The upper surface 41 of the button, which is intended to be contacted by the user's finger, is shaped to enable the user to press the button downwards (arrow 50) into the S1 position, and simultaneously (in the S1 position) move the button laterally (arrow 52). The first switch 34 preferably has a low friction cap or plunger, thereby enabling the button to slide sideways over the switch. (In an alternative embodiment of the invention, the switches 34, 36 may be arranged to move sideways with the button, but this requires a more complex assembly as the second switch 36 would need to be on a moveable mount.)

As the button moves sideways, the lip region 40 passes underneath the corner region 42 of the frame 32. Sideways displacement of the order of 2 mm to 4 mm is considered appropriate, so as to provide the user with tactile feedback that the button has moved. By virtue of the action of the spring 38, the lip portion 40 is held against the frame, retaining the button in the S1 position and giving the arrangement shown in FIG. 4. The retention of the button in the S1 position means that the first switch 34 remains actuated, and audio capture is maintained. The second switch 36 is not actuated, and hence the corresponding logic states of the switches are S1=1; S2=0.

So as not to leave a void around the button 30 when it is displaced laterally (arrow 52), the portion 44 of the button distal from the lip portion 40 also extends laterally. The frame 32 is shaped (region 46) to accommodate said portion 44 of the button. As shown in FIG. 4, although the button has been pressed down into the S1 position and displaced laterally so as to lock it in the S1 position, the button portion 44 and the frame region 46 overlap so as to prevent a gap from forming near the button.

Whilst in the S1 position (either locked there or not) the button 30 may be pressed further, into the S2 position, in order to effect image capture events (e.g. 12, 14, 16 and 18 in FIG. 1). Pressing the button into the S2 position does not deactuate the first switch 34, and so audio capture is maintained. When the button is locked in the S1 position, the application of sufficient extra force by the user in the direction of arrow 54 (FIG. 4) presses switch 34 against switch 36 and thereby actuates switch 36 to effect image capture. This gives the temporary arrangement as shown in FIG. 5, in which both switches are actuated (S1=1; S2=1). On release of the button by the user, the effect of the spring 38 is to return (arrow 56) the button to the S1 position. Further images may be captured, as and when desired, simply by pressing the button from the S1 position to the S2 position and releasing. That is to say, the user cycles the button between the configurations shown in FIG. 4 and FIG. 5.

In order to end audio capture (event 19 of FIG. 1), the user simply pushes the button 30 in the opposite direction to arrow 52, thereby releasing the lip portion 40 from beneath the frame region 42. The spring 38 then causes the button to revert to the initial (SO) position, which deactuates switch 34 to give the arrangement shown in FIG. 3.

The processor may be configured such that if the button 30 is held in the S2 position (e.g. as in FIG. 5) the camera captures a series of still images in rapid succession, or captures a sequence of video images. The user may be provided with an option via the camera's user interface to enable him to choose between rapid stills capture or video capture when the button is held in the S2 position. Depending on the capabilities of the camera, the video images may be captured at a lower resolution than the still images.

Figure 6:
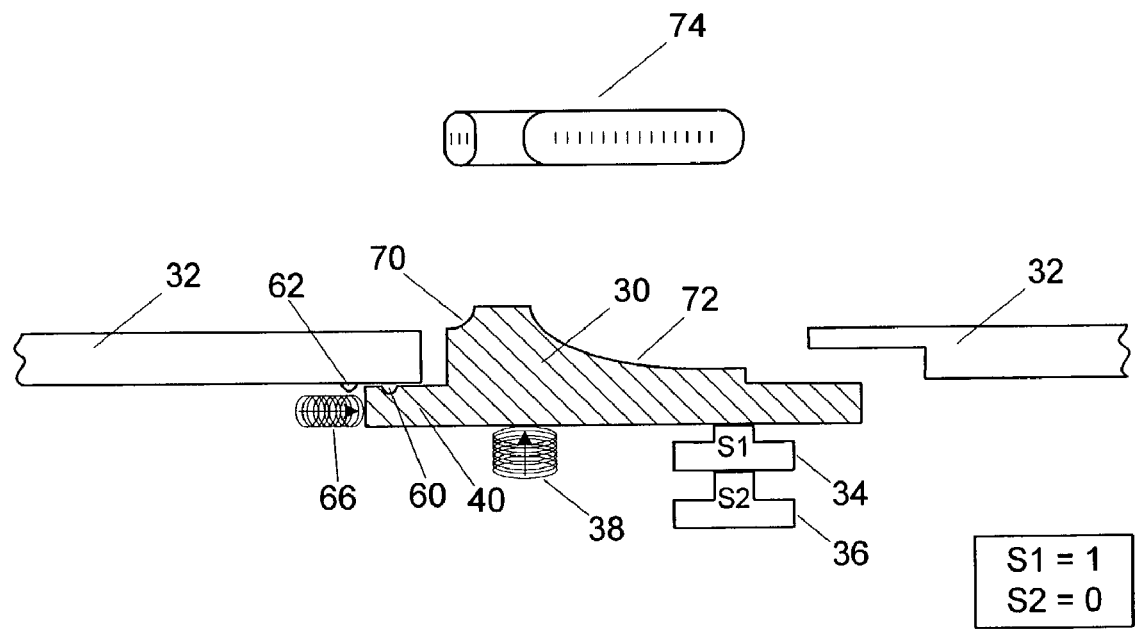
FIG. 6 illustrates a cross-sectional view of a button having a modified profile and incorporating a detent to retain the button when laterally displaced in the first position, and a plan view of part of the button from above.
Figure 7:
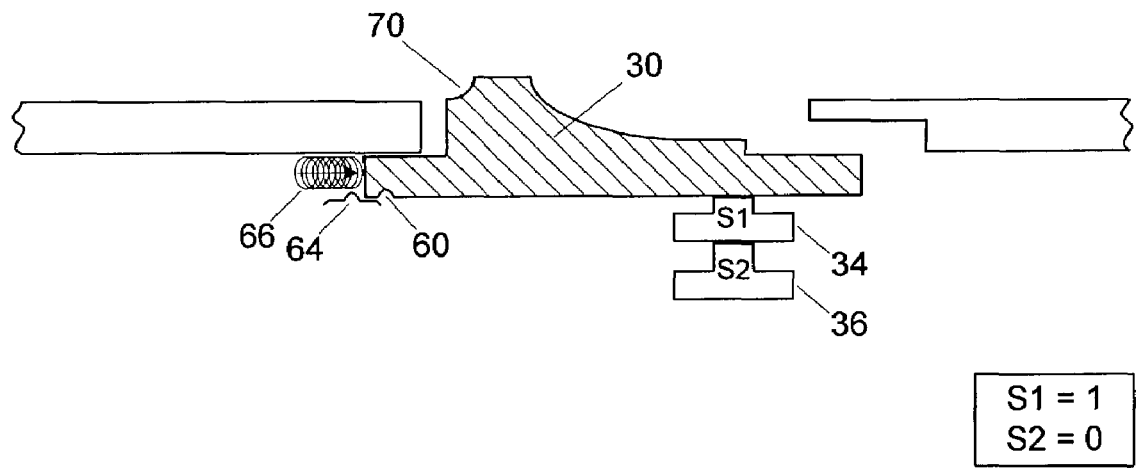
FIG. 7 illustrates a button as in FIG. 6 but with the detent provided in an alternative position.

As shown in FIGS. 6 and 7, in order to provide enhanced, more positive, retention of the button when displaced laterally in the S1 position, a detent 60 may be provided on the lip portion 40 of the button 30. As illustrated in FIG. 6, the detent may act between the lip portion 40 and the underside of the frame 62. Alternatively, as shown in FIG. 7, the detent may be provided by a leaf spring 64. The leaf spring may be configured to deflect when the button is pushed into the S2 position.

FIGS. 6 and 7 both illustrate the incorporation of a spring 66 acting against the lip portion of the button 30. The spring 66 is provided to assist the return of the button from the S1 position to the S0 position when the user moves the button sideways out of the retained S1 position. It is important that the spring 66 should not have too great a spring constant, to ensure that it does not overcome the retaining effect of the detent 60. It is important that the button 30 should only be able to overcome the detent and return to the initial position when pushed past the detent by the user. Also, the distance through which the button is laterally displaced when being retained, and the size of the detent itself, are both made sufficiently large so as to avoid accidental release of the button from the retained S1 position when the button is pushed down into the S2 position.

Whilst the biasing spring 38 is shown in FIG. 6, it is not shown in FIG. 7. As an alternative to using the biasing spring 38, the leaf spring 64 may be arranged to provide the same biasing effect as the biasing spring 38, and hence the biasing spring 38 may not be required. Alternatively, as mentioned above, the switches 34, 36 may have integral springs which provide the desired biasing effect on the button 30.

It will be appreciated that other arrangements and combinations of the biasing spring 38, the spring 66, the leaf spring 64 and detents are possible, in order to provide the desired behaviour of the button 30. More than one of each of the springs may be included, or some of them may be omitted.

As also shown in FIGS. 6 and 7, the profile of the top surface of the button may be shaped to assist the user in pushing it out of the retained S1 position. For this purpose, a small relieved region 70 may be provided on the top of the button, on the edge nearest the extending lip portion 40. The user may push on this relieved region 70 to urge the button out of the retained S1 position. The geometry of the button is such that the button does not accidentally actuate the S2 switch when moved out of the S1 position. As with the buttons shown in FIGS. 3, 4 and 5, the top surface of the button also includes a region 72 profiled to aid the user in pushing the button down into the S1 position and sideways to be locked there. A plan view 74 of the top surface of this button is also illustrated in FIG. 6.

Figure 8:
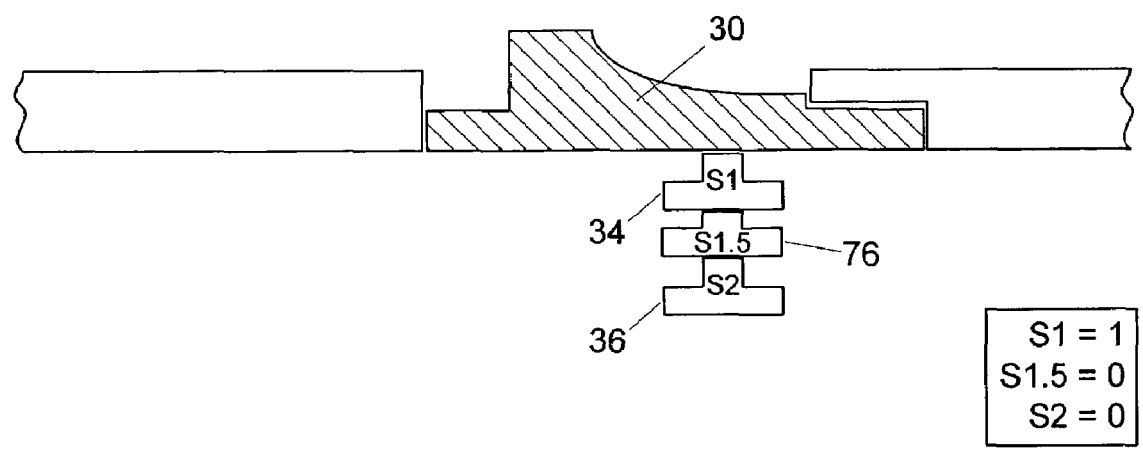
FIG. 8 illustrates a button as in FIGS. 3, 4 and 5 having a third switch (S1.5) operable to effect focus lock.

Although the S1 position is commonly referred to as the focus lock position, it will be appreciated that, in the examples given above, the S1 position is not being used to lock the focus of the camera. However, the button may also be used to effect focus lock, and an arrangement to realise this is shown in FIG. 8. In this figure, a third switch 76 is provided to effect focus lock, and the corresponding button position may be referred to as S1.5, midway between the S1 and S2 positions. The S1.5 switch 76 is positioned and configured to be actuatable when the button 30 is gently depressed from the S1 position towards the S2 position, for example, by virtue of having a spring constant partway between those of the S1 and S2 switches. Focus lock is thereby effected, and then the button may be fully depressed into the S2 position to take the photograph. Operation of the S1.5 switch 76 may take place regardless of whether or not the button has been laterally displaced and retained in the S1 position. If a simple "point and shoot" image capture action is required, then the user may simply push the button from the S1 position straight through the S1.5 position to the S2 position. The processor may be configured to ignore the actuation of the S1.5 switch in such instances, by detecting that the S2 switch has been actuated virtually immediately after the S1.5 switch and interpreting this to mean that focus lock was not required.

Alternatively, to avoid the need for a third switch for the S1.5 position, the processor may be set to redefine the S1 position as being for focus lock rather than audio capture. Although this has the advantage that a third switch is not required, it will be appreciated that audio capture and focus lock cannot then both be achieved simultaneously.

In FIGS. 3 to 9 inclusive, it is important to note that the figures exaggerate the size of the step to be overcome when moving the button into the retained S1 position. In practice, as those skilled in the art will appreciate, the geometry of the button may be different, and the retention mechanism may be more subtle than suggested in the figures.

EMBODIMENT 2

Rotary Control Device

Figure 9:
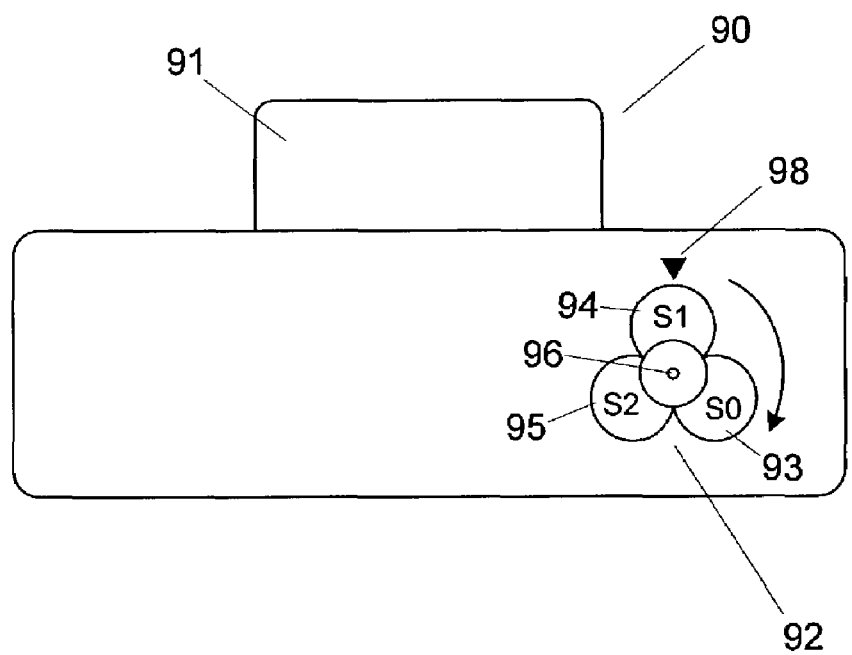
FIG. 9 illustrates a plan view from above of a digital camera having a rotatable shutter control device in accordance with a second embodiment of the invention.

FIG. 9 illustrates an alternative embodiment of the present invention, showing a plan view from above of a camera 90 having a rotary control device 92. The lens assembly of the camera is designated by 91. This control device comprises three lobes 93, 94, 95 extending from a central spindle or shaft 96. The device 92 is rotatable about the shaft 96, and may be rotated by the user pushing against any of the lobes. Each lobe corresponds to an audio or image capture condition: S0 (neither image capture nor audio capture), S1 (to effect audio capture) and S2 (to effect image capture). Electronic sensors are incorporated beneath the device to detect the rotational position of the device with respect to a marker 98. The sensors essentially inform the camera's processor which lobe has been brought alongside the marker 98.

Figure 10:
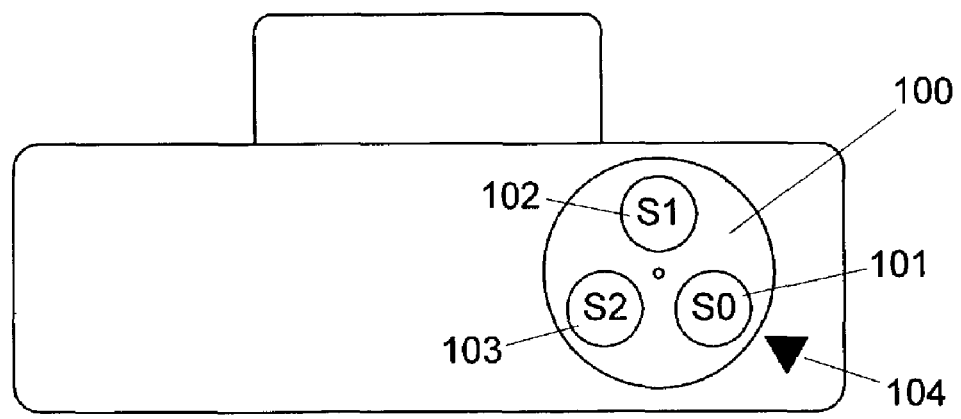
FIG. 10 illustrates a plan view from above of a digital camera having an alternative form of rotatable shutter control device.

An alternative rotary control device is shown in FIG. 10. Instead of comprising protruding lobes, this rotating device 100 is flatter and incorporates one or more recesses or dimples by which the user can effect rotation of the device. In the example shown in FIG. 10, three dimples 101, 102, 103 are provided, corresponding respectively to the S0, S1 and S2 conditions. Again, electronic position sensors are provided beneath the device to detect which dimple has been brought alongside the marker 104.

The examples shown in FIGS. 9 and 10 may both function in the same way. In each case, a detent is provided to enable the rotary device to be retained in the S1 position (e.g. as shown in FIG. 9). A detent may also be provided in the S0 position and, optionally, in the S2 position.

In use, the rotary device 100 is rotated from the initial S0 position to the S1 position, to initiate audio capture. Then, when desired, the device is rotated further, from the S1 position to S2, to capture an image. The camera's processor is programmed to recognise that if the device is rotated into the S2 position from S1, audio capture is to be maintained. (As before, the device may be held in the S2 position to capture a series of images in quick succession, or a video sequence.) After an image has been captured, the device may be returned to the S1 position to continue audio capture, which is maintained until the device is rotated back to S0.

A spring return may be provided to act between the S1 and S2 positions, so as to return the device automatically from the S2 position back to S1 when each photograph is taken. If such a spring return is provided, then rotation from S2 directly to S0 is not possible, and consequently it is necessary to rotate the device from S1 to S0 to end audio capture. However, if no spring return is provided then, after taking a photograph in the S2 position, the user has a choice of rotating the device back to S1 to continue audio capture, or to move it directly from S2 to S0 to end audio capture right away.

Figure 11:
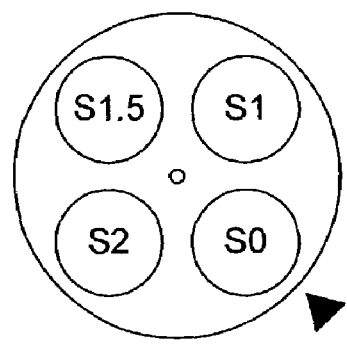
FIG. 11 illustrates another alternative form of the rotatable shutter control device.

With respect to the rotary devices shown in FIGS. 9 and 10, the camera's processor may be configured to assign the S1 position to either audio capture or focus lock. However, both audio capture and focus lock are achievable if the rotary device is provided with a fourth position (S1.5) corresponding to focus lock, as shown in FIG. 11. A dedicated position sensor may be provided specifically to detect when the S1.5 position is aligned with the marker, although it is also possible to configure the processor such that the S1.5 position is essentially a virtual position, defined by the device having been rotated to an intermediate position between S1 and S2.

In use, the user may rotate the device from S0 to S1 to begin audio capture, then to S1.5 to lock the focus and then to S2 to capture an image. Alternatively, the rotation may be straight through from S1 to S2 for a "point and shoot" action. Having taken the photograph in the S2 position, the device may then be rotated back to S1 to maintain audio capture (and to allow for further photographs to be taken) or to S0 to end audio capture.

Figure 12:
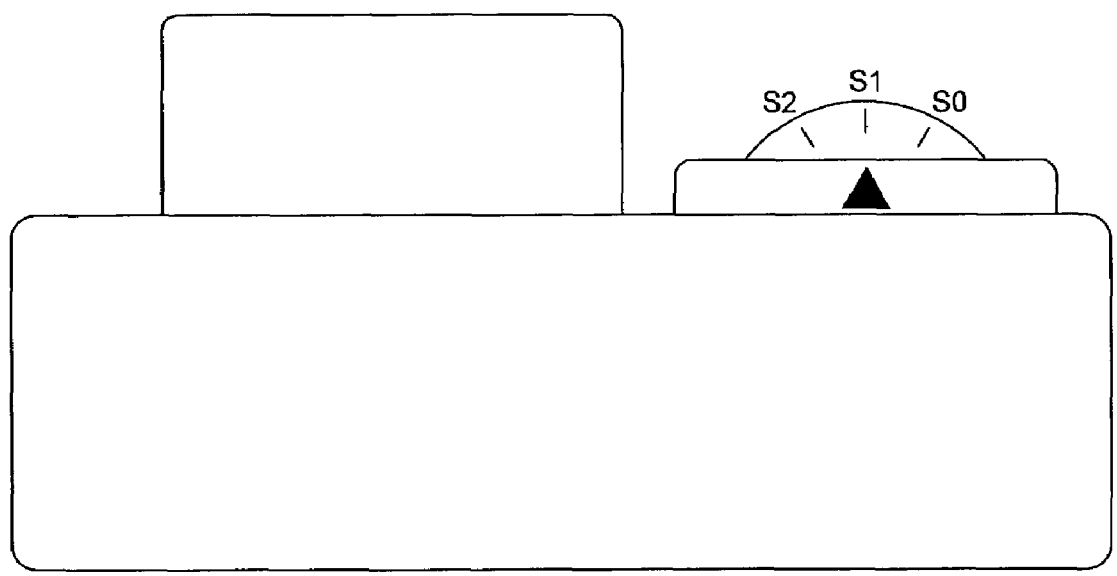
FIG. 12 illustrates a plan view from above of another digital camera having a rotatable shutter control device.

A rotary control device as described above may be located on top of a digital camera, or alternatively may be mounted so as to protrude from a side (e.g. the front) of the camera as illustrated in FIG. 12. In this configuration it may not be intended for the rotary device to be rotatable through a full circle, and indeed it may be that the S0, S1 and S2 positions (and optionally also a S1.5 position) are each separated by only a few degrees of rotation.

EMBODIMENT 3

Electronic Latch

Embodiments 1 and 2 above involve providing means by which the user-operable member (e.g. the button or the rotary device) may be retained in the S1 position. In contrast, this embodiment of the invention uses the camera's processor to retain the camera in the audio capture state, without the button or rotary device actually having to be locked in the S1 position.

This sustained audio capture functionality may be primed by the user via the camera's user interface. Ideally the camera provides a visual indication (e.g. by illuminating an LED) of when the camera has been locked in the audio capture mode. A typical sequence of events, achievable using this electronic latch, is as follows:

The user primes the electronic latch via the user interface. On moving the image capture button from the S0 position to S1 position, audio capture is initiated and the LED indicator is illuminated. Audio capture is maintained even if the button is released back to the S0 position. Then, when desired, the user presses the button fully through to the S2 position to take a photograph. The momentary passing though the S1 position is ignored by the processor (although if the button is held in the S1 position prior to taking the photograph then this may be interpreted by the processor as an instruction to effect focus lock). The processor may be programmed to continue audio capture when the button is subsequently released back to S0, and to allow further photographs to be taken when it is again pressed down to S2. The processor may be programmed to terminate audio capture (and turn off the LED) when the button is finally moved from S0 to S1 and then back to S0, or through another predefined sequence of positions.

The invention claimed is:

1. A digital camera having both image capture and audio capture modes, the digital camera comprising:
   a control member moveable from an initial position to a first position for effecting audio capture and to a second position for effecting image capture; and
   releasable latch means to latch the camera in the audio capture mode upon entry of the control member into the first position,
   wherein the control member comprises a button located within a frame, the button being moveable in a first direction into the first and second positions; the button and the frame are adapted to allow lateral displacement of the button when in the first position, said lateral displacement being in a direction substantially orthogonal to the said first direction; and the button and the frame comprise regions adapted to engage and thereby retain the button when the button is laterally displaced in the first position.

2. A digital camera as claimed in claim 1, further comprising first switching means operable in use to effect audio capture and second switching means operable in use to effect image capture, the first switching means being arranged such that movement of the button into the first position actuates the first switching means, and the second switching means being arranged such that movement of the button into the second position actuates the second switching means, the second switching means being actuatable by depression of the button regardless of whether or not the button is retained in the laterally-displaced first position.

3. A digital camera as claimed in claim 2, wherein the first and second switching means are such that the force required to actuate the first switching means is less than the force required to actuate the second switching means.

4. A digital camera as claimed in claim 1, wherein the camera is configured such tat, on moving the control member from the initial position into the first position, audio capture is initiated and the camera is retained in the audio capture mode until the control member is moved to another predefined position or through a predefined sequence of positions.

5. Control means for a digital camera, the digital camera having both image capture and audio capture modes, the control means comprising:
a user-operable member moveable from an initial position to a first position for effecting audio capture and to a second position for effecting image capture;
sensing means for detecting when the said member is in the first position or the second position;
processing means electrically coupled to the sensing means, the processing means being responsive to input from the sensing means and configured to effect audio capture and/or image capture in the camera in accordance with the input from the sensing means; and
retaining means adapted to retain the user-operable member in the first position, wherein:
the user-operable member and/or the processing means are operable to retain the camera in the audio capture mode when the user-operable member is moved in use into the fast position, such that the user need not manually hold the user-operable member in the first position;
the user-operable member comprises a button located within a frame, the button being moveable in a fast direction into the first and second positions;
the button and the frame are adapted to allow lateral displacement of the button when in the first position, said lateral displacement being in a direction substantially orthogonal to the said first direction; and
the button and the frame comprise regions adapted to engage and thereby retain the button when the button is laterally displaced in the first position.

6. Control means as claimed in claim 5 wherein the regions adapted to engage comprise a lip portion extending from the button and adapted to catch around the frame.

7. Control means as claimed in claim 5 wherein the regions adapted to engage comprise a detent.

8. Control means as claimed in claim 5, wherein the sensing means comprise first switching means operable in use to effect audio capture and second switching means operable in use to effect image capture, the first switching means being arranged such that movement of the button into the first position actuates the first switching means, and the second switching means being arranged such that movement of the button into the second position actuates the second switching means, the second switching means being actuatable by depression of the button regardless of whether or not the button is retained in the laterally-displaced first position.

9. Control means as claimed in claim 8 wherein the first and second switching means are such that the force required to actuate the first switching means is less than the force required to actuate the second switching means.

10. Control means as claimed in claim 9 wherein the first and second switching means are arranged in series.

11. Control means as claimed in claim 10 wherein the first and second switching means are mounted such that their lateral position with respect to the frame remains constant, even when the button is laterally displaced.

12. Control means as claimed in claim 9, further comprising third switching means operable in use to effect focus lock in the camera wherein the third switching means are such that they are actuated on application of a force between that required to actuate the first switching means and that required to actuate the second switching means.

13. Control means as claimed in claim 8 further comprising third switching means operable in use to effect focus lock in the camera.

14. Control means as claimed in claim 5, further comprising biasing means arranged to urge the button into the initial position when it is not being retained in the first position.

15. Control means as claimed in claim 14 wherein the biasing means comprise a spring acting on the button in the direction of the initial position.

16. Control means as claimed in claim 14 wherein the biasing means are integral with the switching means.

17. Control means as claimed in claim 5, wherein the processing means are configured such that, on moving the user-operable member from the initial position into the first position, the processing means effect audio capture and retain the camera in the audio capture mode until the user-operable member is moved to another predefined position or through a predefined sequence of positions.

18. Control means as claimed in claim 17 wherein the said predefined position is the initial position.

19. Control means as claimed in claim 17 wherein the said predefined sequence of positions comprises moving from the first position back to the initial position.

20. Control means for a digital camera, the digital camera having both image capture and audio capture modes, the control means comprising:
a user-operable member moveable from an initial position to a first position for effecting audio capture and to a second position for effecting image capture;
sensing means for detecting when the said member is in the first position or the second position;
processing means electrically coupled to the sensing means, the processing means being responsive to input from the sensing means and configured to effect audio capture and/or image capture in the camera in accordance with the input from the sensing means; and
a detent at the first position for retaining a rotary member at the first position;
a detent at the initial position;
a detent at the second position;
a third position between the first and second positions, whereby rotation of the rotary member into the third position in use effects focus lock; and a spring return acting on the rotary member and arranged to return the rotary member from the second position to the first position, wherein;

the user-operable member and/or the processing means are operable to retain the camera in the audio capture mode when the user-operable member is moved in use into the first position, such that the user need not manually hold the user-operable member in the first position;

the user-operable member comprises the rotary member rotatable from the initial position to the first position and then, in the same rotational sense, further rotatable to the second position; and the rotary member is further rotatable, in the same rotational sense, from the second position to the initial position.

21. Control means as claimed in claim 20 wherein the third position is provided with sensing means electrically coupled to the processing means.

22. Control means as claimed in claim 21 wherein the third position is further provided with a detent.

23. Control means as claimed in claim 20 wherein the third position is a virtual position defined by the rotary member having been rotated past the first position and towards the second position but without having reached the second position.

24. Control means as claimed in claim 20 wherein, if the rotary member is held in the second position, the processing means are configured to cause the camera to capture a video sequence or a plurality of still images in quick succession.

* * * * *

UNITED STATES PATENT AND TRADEMARK OFFICE
CERTIFICATE OF CORRECTION

PATENT NO. : 7,113,219 B2 Page 1 of 1
APPLICATION NO. : 10/242583
DATED : September 26, 2006
INVENTOR(S) : Guy de warrenne Bruce Adams et al.

It is certified that error appears in the above-identified patent and that said Letters Patent is hereby corrected as shown below:

In column 5, line 48, delete "users" and insert -- user's --, therefor.

In column 11, line 21, in Claim 4, delete "tat" and insert -- that --, therefor.

In column 11, line 45, in Claim 5, delete "fast" and insert -- first --, therefor.

In column 11, line 49, in Claim 5, delete "fast" and insert -- first --, therefor.

In column 13, line 3, in Claim 20, delete "wherein;" and insert -- wherein: --, therefor.

Signed and Sealed this

Sixteenth Day of June, 2009

JOHN DOLL
*Acting Director of the United States Patent and Trademark Office*